J. J. Wharam
J. J. Felts
INVENTORS

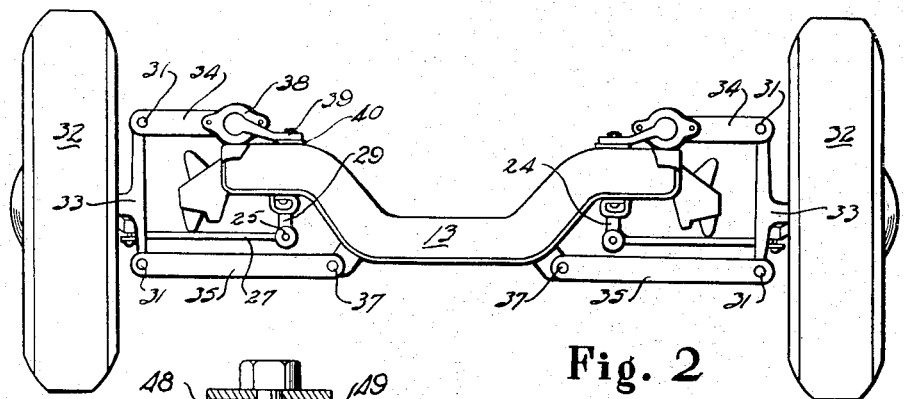
Fig. 2
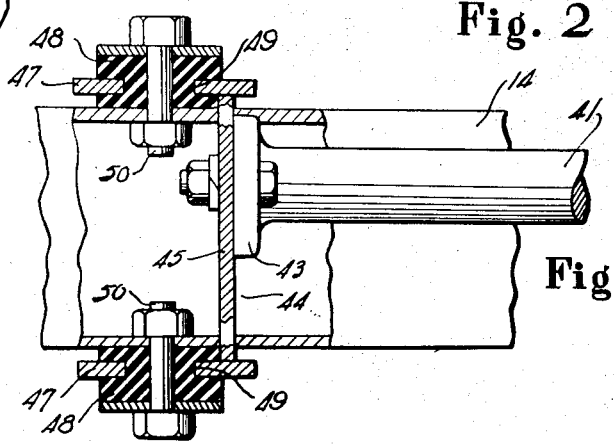
Fig. 3
Fig. 5
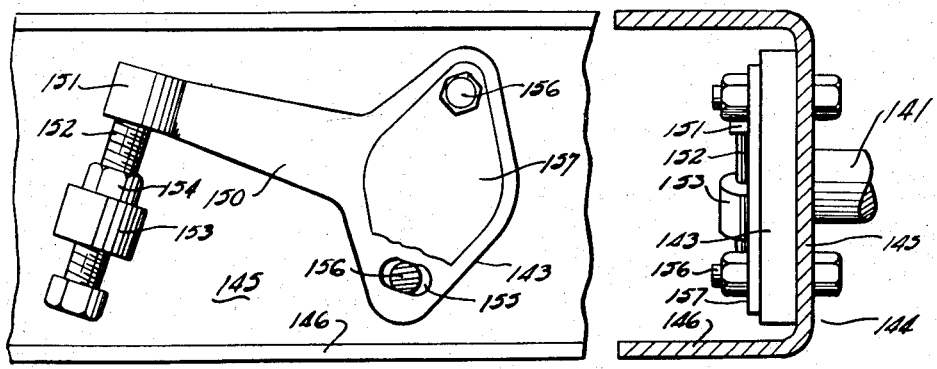
Fig. 4
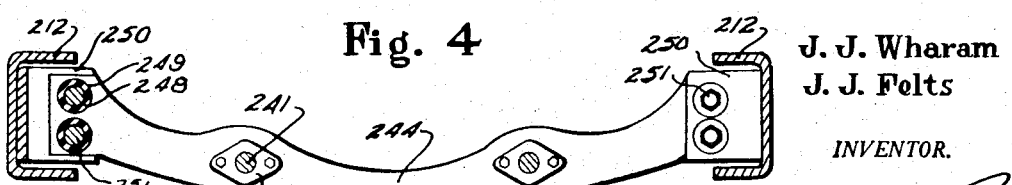
Fig. 6
J. J. Wharam
J. J. Felts
INVENTOR.

Patented May 16, 1950

2,508,130

UNITED STATES PATENT OFFICE 2,508,130

INDEPENDENT SUSPENSION

John J. Wharam, Dearborn, and Jerome J. Felts, Pontiac, Mich., assignors to Ford Motor Company, Dearborn, Mich., a corporation of Delaware Application May 30, 1945, Serial No. 596,732

8 Claims. (Cl. 267—57)

This invention relates to the springing of motor vehicles; and, more particularly, to an individual wheel suspension spring system employing torsion bars as the resilient connecting means.

The construction shown in this application is that of a motor vehicle having independently sprung front wheels employing, as the resilient mounting, individual torsion bars acting directly with each of the independent springing units. Basically, the same construction may also be applied to the rear wheels of the vehicle with or without the independent springing feature. The use of longitudinally disposed bars, torsionally stressed, as the resilient supporting means for motor vehicles, and the carriages or wagons which preceded them, has often been proposed. The general construction was utilized in some passenger automobiles—principally of foreign manufacture—before the war and in a number of combat vehicles of the heavier types during the war. While they have served quite satisfactorily in these latter applications, they have not been found as suitable as leaf or coil springs for general passenger-car use. The principal reasons for this appear to be that they are not as adaptable to the different body designs required in mass production of automobiles, they become noisy in operation, and it is difficult to obtain precisely the "ride" effect desired.

On the other hand, the advantages of the construction are quite apparent. The spring is very simple to manufacture, as it requires merely the upsetting or splining of the end of a straight rod so that the attaching means can be fixed to it. The space required for its installation is much less, particularly adjacent the front axle of the vehicle where the possibility of interference is greatest. It particularly lends itself to use with independent suspensions of the double yoke type in which it is formed with one end attached directly to one of the yoke axes. A leaf spring requires considerable clearance, either transversely or longitudinally of the vehicle for installation and effective operation; and, in addition, lubrication should be provided for the separate leaves and a cover for the entire unit. The shackles by which the spring is attached to the frame and the running gear also present a problem of maintenance. The coil spring, while free of the last two objections, is a rather bulky object and requires seats of considerable size both on the frame and the mounting arms to secure it in position. Despite these apparent advantages, the torsion bar type of the springing has not come into widespread use, principally because of the disadvantages pointed out above.

The advantage of the present construction lies not only in the adaptation of longitudinal torsion bars to the independent type of wheel suspension; but in the specific mounting employed at the anchor ends of the torsion bars where the reaction is taken by the frame members of the vehicle. This connection formerly presented the most difficult problems and the best available solutions resulted not only in a noisy and relatively short-lived mounting, but required considerable structural strengthening of the vehicle frame in the vicinity of the anchor points. In the present construction, both of these disadvantages are avoided and the entire mounting as applied is much lighter than that formerly thought necessary. The entire springing system is very compact and it can be readily accommodated with any conventional engine mounting. Indeed, the springing system, per se, is much less cumbersome than those which have been used with leaf coil or torsion springs heretofore.

With these and other objects in view, the invention consists in the arrangement and construction described in this specification, claimed in the claims, and illustrated in the accompanying drawings, in which:

Figure 2 is an elevation of the construction shown in Figure 1 taken from the front of the vehicle.

Figure 3 is a transverse section taken on various planes longitudinally of the vehicle through the torsion bar anchor member.

Figure 4 is a rear elevation of the torsion bar anchor member showing an alternative form of torsion bar attachment.

Figure 5 is a transverse section through the torsion bar anchor member shown in Figure 4.

Figure 6 is a transverse section through the vehicle frame showing an alternative type of torsion bar anchoring member and the manner of mounting it.

Figure 1:
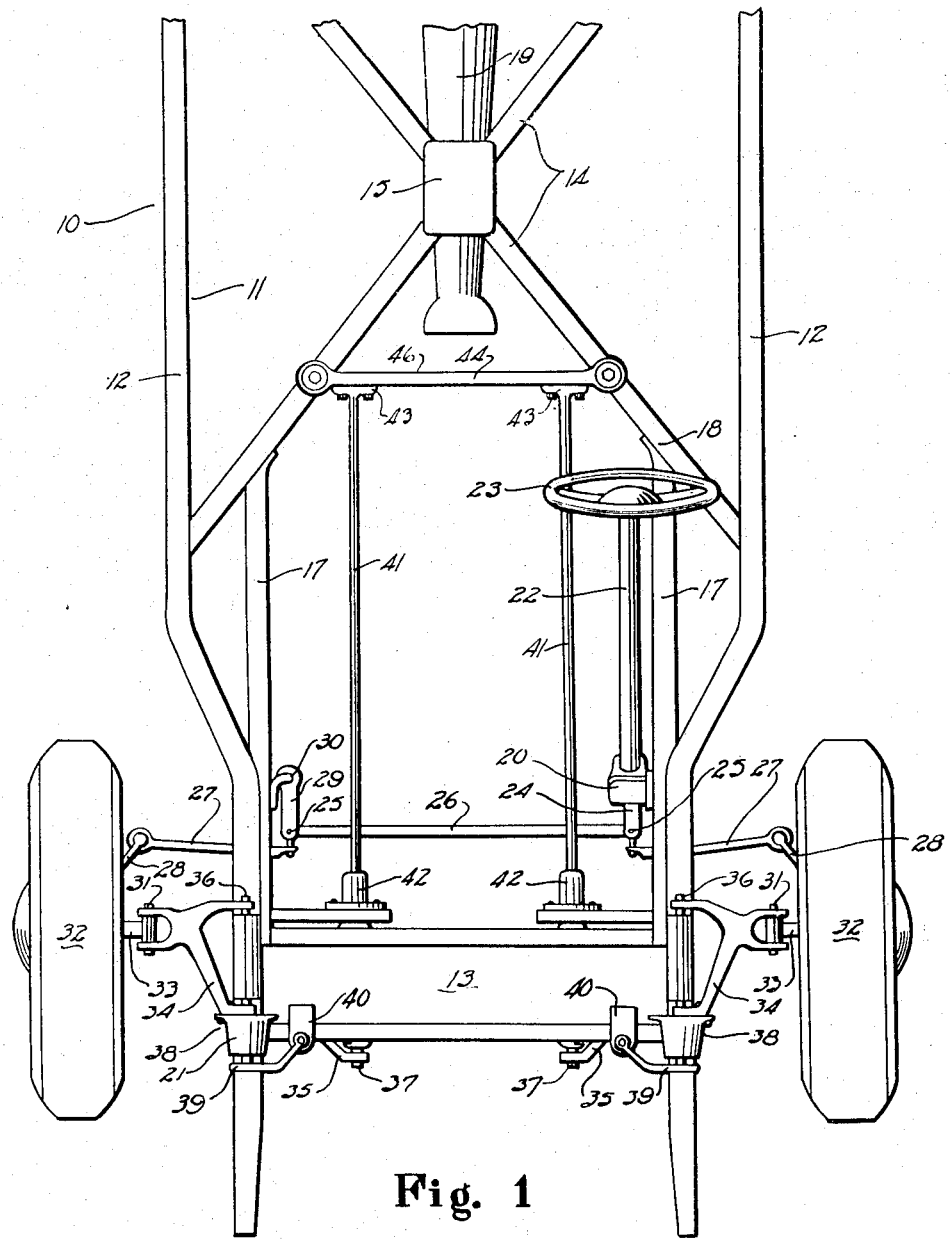
Figure 1 is a plan view of the forward end of a motor vehicle frame showing the attachment of the front wheels and the springing connections.

Referring to Figures 1 and 2, 10 indicates generally a vehicle chassis having a frame 11, comprising the side sills 12, a front cross member 13, and X-members 14 joining in a box section 15 at their intersection and having their ends secured to the side sills 12. An auxiliary longitudinal member 17 extends rearwardly from each side sill 12 to its point of connection 18 with the X-member 14. The engine and transmission are omitted in order to show the spring construction more clearly, but the usual torque tube 19 is indicated in its general position.

The steering gear 20 is mounted on the left-hand auxiliary member 17 supporting the steering column 22 and steering wheel 23, operating the steering arm 24. The arm 24 is connected through the ball joint 25 with the transverse tie rod 26 and the connecting link 27 leading to the wheel steering arm 28. The metal construction is duplicated on the opposite side of the frame, except that an equivalent idler arm 29 is pivoted at 30 on the frame member 17. The steering geometry is so arranged that the pivotal connections on each side between the steering arm (or idler arm), the tie rod and the wheel arms fall at substantially the same point permitting the use of an integrated ball joint construction.

The front wheels 32 are rotatably supported on a king pin which, in turn, is carried by a bracket 33, pivotally mounted on longitudinal axes 31 on the small ends of the upper and lower wishbone links or yokes 34 and 35. The big ends of the links 34 and 35 are attached to the side sills 12 or cross member 13 by the longitudinal pivots 36 and 37, respectively. A shock absorber 38 of the rotating vane type has its housing 21 secured to the forward end of the upper wishbone 34 and the shock absorber arm 39 extends inwardly therefrom to a pad 40 on the front cross member 13 to which it is secured.

The resilient mounting of the wheels is effected by two parallel, longitudinally extending torsion bars 41 which are fixed at their forward ends 42 to the rearward arm of the lower wishbone link 35 in substantial axial alignment with the longitudinal pivot 37. In the embodiment shown in Figure 1, the rear end 43 of the torsion bars 41 are upset and are bolted to the torsion bar anchor member 44, which is resiliently supported at its opposite ends on the frame X-members 14. A detail of the mounting of the torsion bar anchor member 44 on the X-member 14 is shown in Figure 3 and it will be noted that the member 44 is formed from a channel section, the web 45 being disposed forwardly and flanges 46 extending rearwardly therefrom. Adjacent the ends of the member the conformation is modified to form upper and lower extending ears 47 adapted to lie above and below the X-member 14—the web 45 of the member 44 being cut away to permit this arrangement.

The torsion bar anchor member 44 is resiliently supported on the X-members 14 by means of interposed rubber pucks 48 which are mounted in enlarged apertures 49 in each ear 47 and whose inner surfaces bear on the upper and lower flanges of the X-member 14. The puck 48, accordingly, allows a substantial degree of freedom of movement, particularly in the vertical transverse plane to the torsion bar anchor member 44, which, however, is secured in an approximate position by the bolts 50 extending through the pucks 48 and the flanges of the X-member 14.

A second embodiment is shown in Figures 4 and 5, it being understood that the wheel mounting and frame are substantially identical to that shown in preceding drawings as is the method of attachment of the torsion bar anchor member which, in this construction, is identified as 144. The torsion bar 141 has an enlarged, diamond-shaped rear end 143; but in this case, although the web 145 of the frame member 144 is still positioned forwardly, the torsion bar 141 extends through it so that the rear end 143 is in contact with the rear face of the web 145. The flanges 146, so far as the end construction is concerned and the method of attachment to the vehicle frame members are precisely the same as that shown in Figure 3. The rear end 143 is formed with an extending lever arm 150, having an end boss 151; and an adjusting bolt 152 threadedly mounted in the lug 153 secured to the web 145 of the frame member 144, may be advanced or retracted to change the relative radial position of the arm 150 and thus apply an additional torsional stress on the associated torsion bar 141. A nut 154 is provided to lock the bolt in adjusted position with respect to the lug 153. The end 143 has the circumferentially enlarged holes 155 at opposite ends thereof and bolts 156 extend through these and the web 145 of the frame member 144 and the cover plate 157, so that after an initial adjustment of the torsion bar has been obtained by the manipulation of the bolt 152, the entire assembly may be securely locked in the selected engagement with respect to the frame member 144.

Another alternative construction is shown in Figure 6 relating to the attachment of the torsion bar anchor member 244 directly to the sills 212 rather than to the X-members. In this case, the member 244 has enlarged apertures 249 at each end in which are seated rubber pucks 248, engaging a channel bracket 250 secured to the frame and held in place by the bolts 251. This permits the necessary scope for vertical movement of the anchor member. The particular conformation of the member 244 permits its installation between the sills without interference with the X-members and the torque tube disposed above it.

The advantage of the present construction is that, in most instances, instead of transferring the torsional springing load to the frame of the vehicle, the reaction is afforded by the anchor member which is substantially freely supported on the frame, and is substantially equalized by the opposite torsion member through the intermediation of the anchor member.

This is particularly true when both front wheels of the vehicle encounter the same bump or depression in the roadway. In the former case, the yokes move upwardly and the left-hand bar is twisted in a counterclockwise direction, while the right-hand bar is subjected to a torsional stress substantially equal in magnitude but directed clockwise. The reaction, then, is supplied entirely through the anchor member and the only force impressed on the frame in consequence is a proportional part of the weight of the bar and anchor assembly. Of course, if but one wheel is displaced, or if the wheels are displaced in the opposite directions, the situation is somewhat complicated. Thus, if it be assumed that the left wheel encounters a bump, it would tend to rise in the vertical plane, causing a consequent counterclockwise torsional deflection of the corresponding torsion bar 41, and while a portion of this stress would be absorbed by the work incident to the torsional deflection, a substantial amount would necessarily be resisted by the rear end anchor or attachment of the bar. In normal practice, the anchor so provided was attached directly to a frame component which served as a rigid reaction member. In the present construction, however, both torsion bars are considered as an integral unit in connection with the anchor member, so that under the circumstances outlined, the anchor member would also be subjected to a force tending to turn it in a counterclockwise direction. Instead of resisting this primarily through the frame, due to the interposition of the resilient mounting, this movement of the anchor member 44 is also resisted by the other torsion bar 41, which will also be twisted slightly in the same direction. This, however, would tend to lower the right wheel a slight amount. This is countered by the application of a conventional stabilizer or roll check. The amplitude of rotational movement of the anchor member is quite small and the force is not excessive. Nevertheless, under most circumstances, it will be most desirable to also fit a roll check device between the opposite wheels and rely upon the joint action of the stabilizer and the torsion bars which have been described in detail, as affording requisite springing means between the frame and the wheel mountings.

Another advantage of the present construction is that the springing of both wheels is taken care of by one integrated unit and the necessary resistance is afforded primarily within the springing arrangement itself rather than through the frame reaction or through utilization of the frame or its fixed members as a primary anchoring means. One principal benefit accruing from this construction in that the noise which was formerly directly transmitted to the body through the torsion bars is now very largely avoided. Indeed, this fact, as much as any other, limited the use of this type of springing for passenger motor vehicles. It is clear that in former torsion bar constructions, any noise originating in the running gear would be transmitted directly to the frame and thence to the body without the benefit of any of the damping which was inherently present in the leaf or coil spring arrangements previously used.

It will be observed that the attachment of the anchor member 46 to the X-member or to any other fixed portions or the frame, for that matter, serves not so much as an anchorage against the torsion bar reaction as a securing means to keep the anchor member in approximate relative position and prevent the transmission of noise to the frame members. Indeed, the torsion bars and the associated anchor member together form a complete springing unit and the primary reaction to torsional deflection of one bar is not furnished by the frame alone, but through appropriate interaction of both bars, the anchor member and the resilient frame attaching means.

The principal advantage of the construction shown in Figures 4 and 5, over the fixed mounting shown in Figures 1, 2, and 3, is that it makes the torsion bar mounting much more adaptable to different body constructions. It will be apparent that there will always be an initial deflection in the torsion bars occasioned by the sprung weight of the vehicle. This may be computed and the bars arranged accordingly for any particular body construction. However, as the different types of bodies have different weight distribution, in order to make the bar universally applicable on a single chassis to various body arrangements, means must be provided to change the initial torsional deflection for each. Thus, by suitable adjustment of the bolt 152, the body can be leveled as between the front and rear wheel or suitable adjustment may be made to provide transverse leveling of the body in the event that the bars possess different torsional characteristics. When these have been established, the rear end of the bar can be locked in the selected position by means of the bolts transversing the web and the adjustment is then rendered permanent, so far as that particular setup is concerned.

The construction shown in Figure 6 is merely a further adaptation by which the effective length of the anchor member may be increased. The particular mounting of the shock absorber has the advantage of making the shock absorber an integral part of the wheel supporting link and permitting its mounting forwardly of the links where more space is available.

It will be noted that the springing affected by this construction is remarkably compact and the disposition of the torsion bars is easily arranged to avoid interference; and the forward frame construction is considerably simplified, since the concentrated forces usually imposed thereon in independent wheel suspension—coil spring mountings, are avoided. On the other hand, no particular strengthening is required for the X-frame members or the other fixed structural components of the frame to which the anchor member 44 may be connected, since the major forces are borne through the spring linkage rather than by reaction on the frame.

Certain changes may be made in the detailed constructions shown herein; but it is the intention to cover by the claims these changes and others which may reasonably be made within the scope thereof.

The invention claimed is:

1. In a vehicle wheel suspension, a frame, wheel supporting means including a pair of supporting links extending laterally from each side of said frame and having their inner ends pivotally secured on axes spaced vertically and laterally on said frame, wheels on said wheel supporting means, a pair of parallel longitudinally extending torsion bars having their forward ends fixed to the inner end of one of said links on each side of said frame aligned with said pivot therefor and having their rear ends fixed to a transversely arranged anchor member, a pair of transversely spaced pucks of rubberous material resiliently mounting said anchor member on said frame, said torsion bars and anchor member serving as the sole springing means between said wheels and said frame.

2. In a vehicle wheel suspension, a frame, wheel supporting means including a pair of support links extending laterally from each side of said frame and having their inner ends pivotally secured on axes spaced vertically and laterally on said frame, wheels on said wheel supporting means, a pair of parallel longitudinally extending torsion bars having their forward ends fixed to the inner end of one of said links on each side of said frame aligned with said pivot therefor and having their rear ends fixed to a transversely arranged anchor member, a pair of transversely spaced pucks of rubberous material resiliently mounting said anchor member on said frame for limited movement on a vertical plane with respect thereto, said torsion bars and anchor member serving as the sole springing means between said wheels and said frame.

3. A vehicle wheel suspension, a frame, wheel supporting means including a pair of support links extending laterally from each side of said frame and having their inner ends pivotally secured on axes spaced vertically and laterally thereon, wheels on said wheel supporting means, a pair of parallel longitudinally extending torsion bars having their forward ends fixed to the inner end of one of said links on each side of said frame aligned with said pivot therefor and having their rear ends fixed to a transversely arranged anchor member, said anchor being resiliently supported on said frame at points spaced outwardly of the points of attachment of said torsion bars thereto for limited movement in a vertical plane with respect to said frame, said torsion bars and anchor member serving as the sole springing means between said wheels and said frame.

4. In a vehicle wheel suspension, a frame, a wheel supporting means including a pair of vertically disposed support links extending laterally from each side of said frame and having their inner ends pivotally secured on vertically and laterally spaced axes thereto, wheels on said wheel supporting means, a pair of longitudinally extending parallel torsion bars having their forward ends each fixed to an inner end of the lowermost of said links on each side of said frame aligned with the pivot therefor and having their rear ends fixed to a transversely arranged anchor member, a shock absorber of the rotatable vane type secured to an inner end of each of the uppermost of said links substantially aligned with the pivot therefor, said shock absorber having an extended arm secured to said frame inwardly of said point of pivotal attachment, said anchor member being resiliently mounted at the ends thereof at points spaced substantially outwardly of the points of attachment of said torsion bars thereto on said frame, said torsion bars and anchor member serving as the sole springing means between said wheels and said frame.

5. In a vehicle wheel suspension, a frame, wheel supporting means including a pair of vertically spaced wishbone support links extending laterally from each side of said frame and having their inner ends pivotally secured on vertically and laterally spaced axes thereto, wheels on said wheel supporting means, a pair of parallel longitudinally extending torsion bars having their forward ends fixed to the respective inner end of the rear leg of said wishbone comprising the lower of said links on each side of said frame aligned with said axis of attachment to said frame, the rear end of said torsion bars being secured to a transversely arranged anchor member, said anchor member being resiliently mounted at the end thereof at points spaced substantially outwardly of the points of attachment of said torsion bars thereto on said frame, said resilient mounting permitting limited vertical movement of said anchor member with respect to said frame, said torsion bars and anchor member serving as the sole springing means between said wheels and said frame.

6. In a vehicle wheel suspension, a frame, wheel supporting means including a pair of vertically spaced supporting wishbone links extending laterally from each side of said frame and having their inner ends pivotally secured thereto at laterally and vertically spaced axes, wheels on said wheel supporting means, a pair of parallel longitudinally extending torsion bars having their forward ends fixed to the respective inner ends of the rear leg of said wishbone comprising the lower of said links on each side of said frame aligned with said axis of attachment to said frame, the rear ends of said torsion bars being fixedly secured to a transversely arranged anchor member, said anchor member being resiliently mounted at the ends thereof at points spaced substantially outwardly of the points of attachment of said torsion bars thereto on said frame, said mountings comprising pucks of rubberous material interposed between said anchor bar ends and adjacent members of said frame permitting limited movement of said anchor member with respect to said frame in a transverse vertical plane, said torsion bars and anchor member serving as the sole springing means between said wheels and said frame.

7. The structure of claim 6 which is further characterized in that said adjacent member is a channel section, said anchor member has extending ears adapted to lie above and below the flanges of said channel section, one of said pucks interposed between each of said flange surface and the adjacent ear.

8. The structure of claim 6 which is further characterized in that said adjacent member has a vertical web section, a channel shaped bracket secured to said web section with the flanges thereof extending vertically inwardly, an end of said anchor member received between said flanges, aligned apertures in said flanges and said anchor member end, a resilient bushing of rubberous material extending through said aligned apertures and a bolt extending through said bushing.

JOHN J. WHARAM.
JEROME J. FELTS.

REFERENCES CITED

The following references are of record in the file of this patent:

UNITED STATES PATENTS

| Number | Name | Date |
|---|---|---|
| 391,493 | Swan | Oct. 23, 1888 |
| 400,362 | Rounds | Mar. 26, 1889 |
| 2,169,335 | Best | Aug. 15, 1939 |
| 2,173,974 | Leighton | Sept. 26, 1939 |
| 2,191,211 | Krotz | Feb. 20, 1940 |
| 2,206,901 | Klotsch | July 9, 1940 |
| 2,245,809 | Olley | June 17, 1941 |
| 2,254,282 | Griswold | Sept. 2, 1941 |
| 2,311,420 | Ulrich | Feb. 16, 1943 |